3 Sheets--Sheet 1.
E. CROFT.
Machines for Threading Screw-Blanks.
No. 5,673. Reissued Dec. 2, 1873.
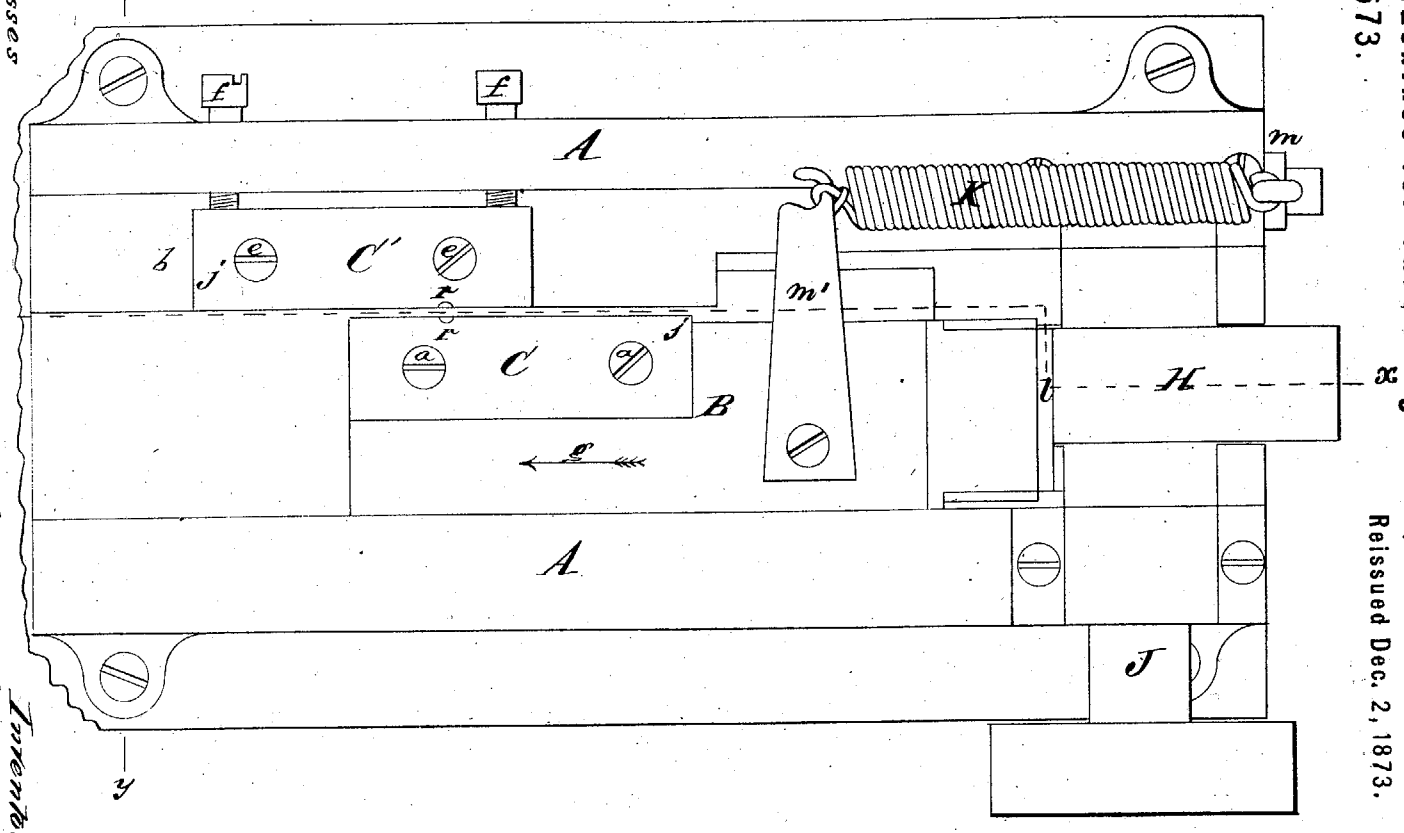
Witnesses
W. L. Benneson.
W. H. Isaacs.
Inventor
Edward Croft
by his att.
E. S. Renwick 3 Sheets--Sheet 2.
E. CROFT.
Machines for Threading Screw-Blanks.
No. 5,673. Reissued Dec. 2, 1873.
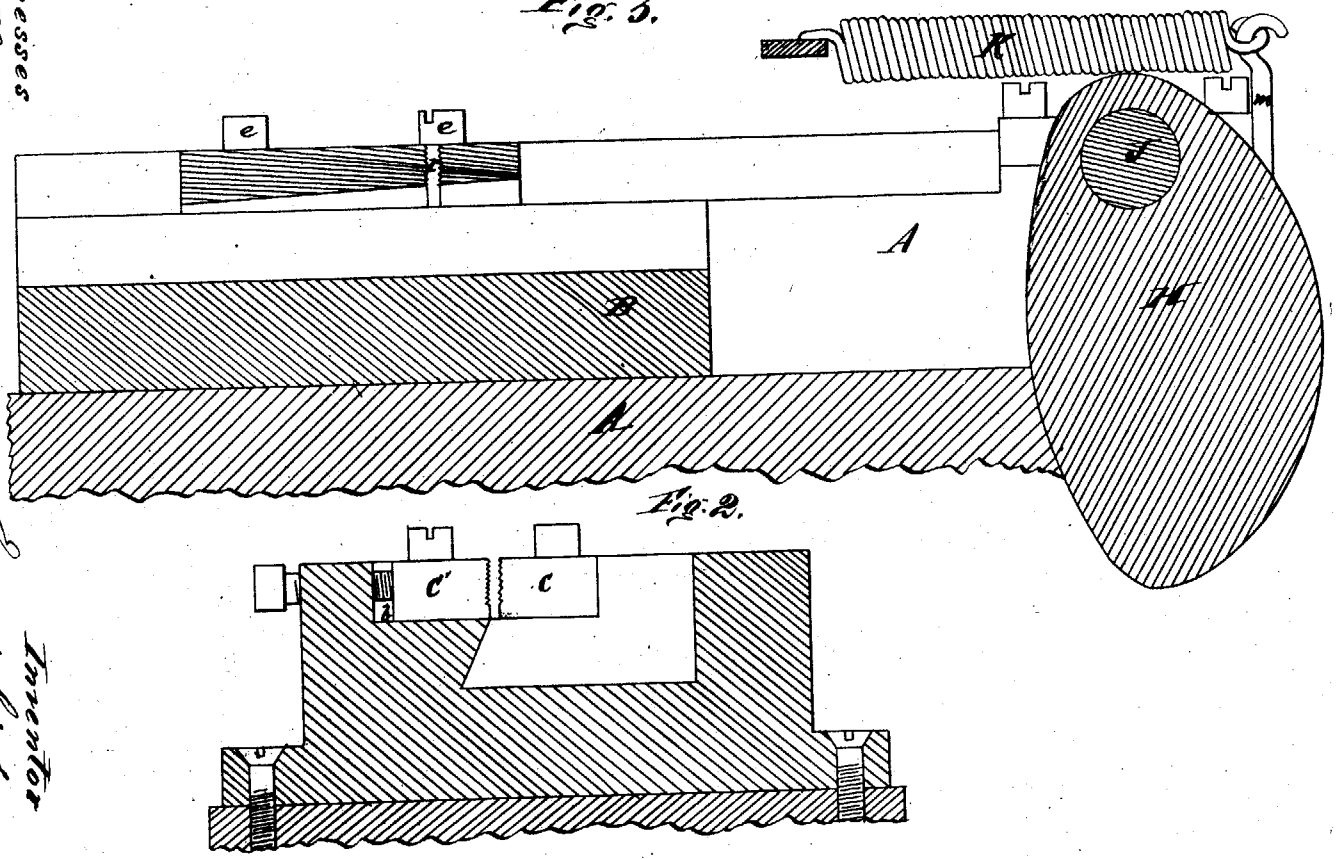
Witnesses
W. L. Bennem.
W. H. Isaacs.
Inventor
Edward Croft
by his att.
C. L. Renwick 3 Sheets--Sheet 3.
E. CROFT.
Machines for Threading Screw-Blanks.
No. 5,673. Reissued Dec. 2, 1873.
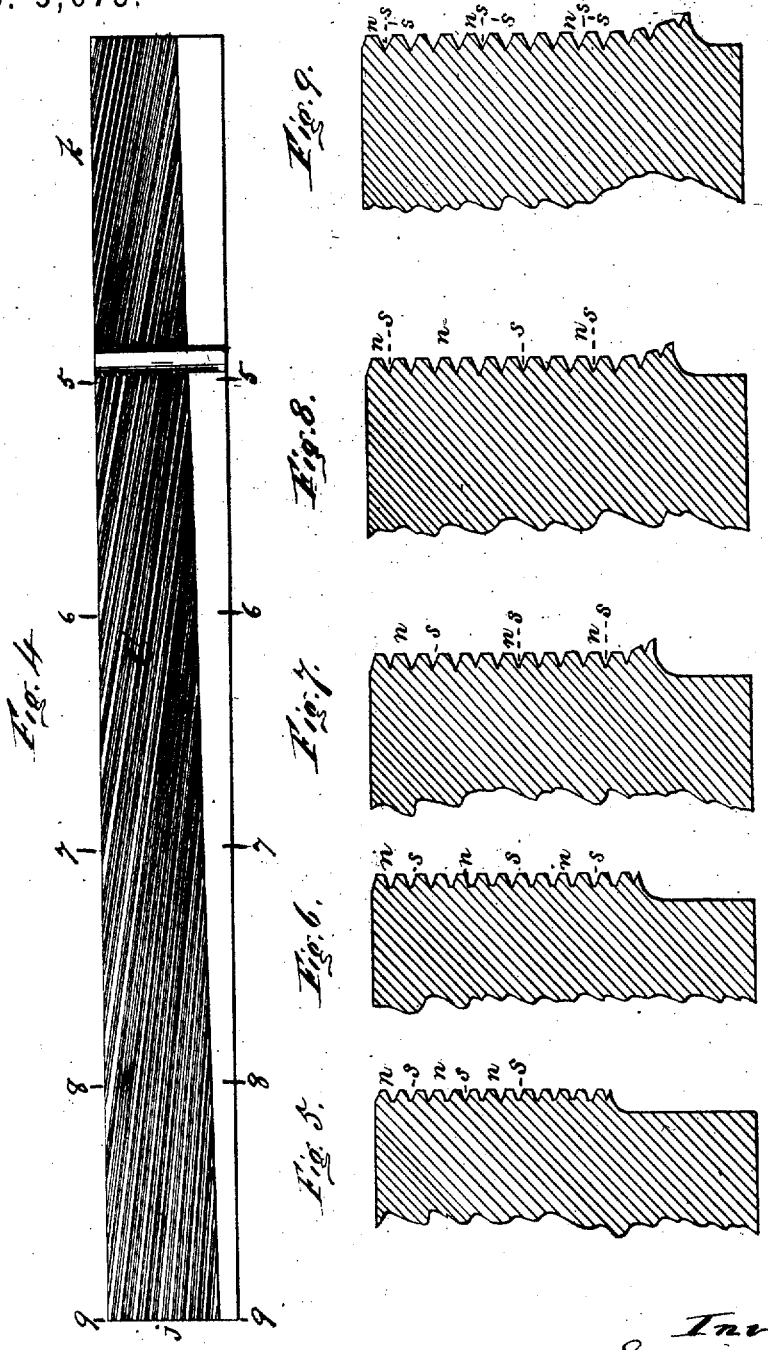
Witnesses
W. L. Bennem.
W. H. Isaacs.
Inventor
Edward Croft
by his att.
E. S. Renwick

UNITED STATES PATENT OFFICE.

EDWARD CROFT, OF WATERBURY, CONNECTICUT.

IMPROVEMENT IN MACHINES FOR THREADING SCREW-BLANKS.

Specification forming part of Letters Patent No. 142,560, dated September 9, 1873; reissue No. 5,673, dated December 2, 1873; application filed November 12, 1873.

*To all whom it may concern:*

Be it known that I, EDWARD CROFT, of Waterbury, in the county of New Haven and State of Connecticut, have made an invention of certain new and useful Improvements in Machines for Threading Screws; and that the following is a full, clear, and exact description and specification of the same.

The invention relates to that class of screw-machines by means of which screw-blanks are threaded by being caused to roll between dies which swage or forge the metal, so as to produce the screw-thread without removing from the screw-blank the material which is between the positions of the threads.

In the said class of screw-machines, as heretofore constructed, so far as I know, the dies have been constructed with indenting-ridges whose profiles are the counterparts of those of the finished screws, and the pitch and profiles are the same from end to end of each die, the swaging or forging being effected by causing these ridges to indent themselves progressively deeper into the blank. The tendency of compression by such indentation is to cause the metal which is compressed at one part to move to another; and the object of my invention is to permit the metal to move more readily in the direction of the length of the screw-blank, the result of which is the diminution of the power required to effect the forging, and of the disruptive strains to which the metal is subjected during the operation. To these ends my invention consists of the combination of two converging dies having faces of indenting-ridges whose profiles increase progressively in pitch from the parts which commence to act upon the blank to or toward the parts where the operation upon the blank is completed. The effect of these dies upon the metal is to cause the blank to extend in length between the threads as the indentation or forging proceeds, so that the portions between the threads are progressively decreased in diameter and increased in length.

The invention may be embodied in dies of various forms longitudinally, according to the construction of the machine in which the dies are used—the invention being applicable to machines with straight dies, one or both of which reciprocate; to machines with curved dies, one or both of which reciprocate; to machines with one rotating and one fixed die; and to machines with two rotating dies moving in opposite directions.

As machines with two straight dies, the one of which is fixed while the other reciprocates longitudinally, are simple in their construction, I have represented in the accompanying drawings such a machine embodying my invention, as an illustration of one form in which the invention may be embodied.

Figure 1 represents a plan of the said machine. Fig. 2 represents a transverse section of the same. Fig. 3 represents a vertical longitudinal section of the same at the line *x x* of Fig. 1. Fig. 4 represents a face view of one of the dies enlarged. Figs. 5 to 9, inclusive, represent transverse sections of one of the dies at the lines 5, 6, 7, 8, and 9 of Fig. 4, and greatly enlarged, so as to show the variation in profile.

The bed A of the machine (represented in the said drawings) is constructed with ears, so that it may be secured to a bench. The bed is grooved longitudinally to receive and guide the traversing die-carriage B, by means of which the reciprocating die C is carried and moved, the said die C being received in a seat formed in the carriage, and being made fast thereto by screws *a a*. Opposite the reciprocating die is the fixed die C′, which rests upon a seat, *b*, of the bed A, and is secured thereto by screws *e e*. Adjusting-screws *f f* are provided to set the die to its proper position, the holes in the die for the stems of the screws *e e* being elongated transversely to the length of the die, so as to permit the requisite movement for that purpose. The carriage B and die C are caused to move in the direction of the arrow *g*, Fig. 1, by means of a cam, H, which is secured to the driving-shaft J, to which a rotary motion is imparted by means of a belt and pulleys, or some other suitable mechanism. The cam bears against a bearing, *l*, secured to the carriage. The return movement of the carriage and die, when the most protuberant part of the cam has passed the bearing, is effected by means of a spring, K, connected with two arms, one of which, *m*, is secured to the bed, and the other, $m'$, to the carriage. By the operation of the cam and spring, the die C is caused to reciprocate along the face of the fixed die C′. The opposing faces of the dies are constructed with ridges $n$, which are separated by grooves $s$, corresponding with the threads of the screw to be forged; and the fixed die C′ is set so that its face is slightly inclined to that of the reciprocating die, so that as the face of one die C moves past that of the other their faces progressively converge. The parts of the dies which are opposite to each other at the time they are at rest, immediately before the cam begins to move the movable die, have shallow transverse grooves $r$ formed in them, to admit of the endwise insertion or feeding in of the screw-blank. The ends $j\,j$ of the dies, which are opposite to each other at the time the reciprocating die has been moved to its greatest extent, correspond in profile with the profile of the completed screw, as represented at Fig. 9. From those discharge ends to the feeding ends of the dies the profile is progressively changed, as represented by Figs. 8 to 5, the ridges $n$ being progressively narrower, and consequently the pitch or distance from one groove to the next being progressively less, so that the pitch and breadth of the ridges are least at the feeding ends $k$ of the dies, and are thence progressively increased to the discharge ends $j$. I prefer, also, to construct the lower sides of the face of the dies with a curved profile, as seen in Figs. 7 to 9, inclusive, the said profile being at the discharge ends of the dies the counterpart of the profile at the point of a gimlet-pointed screw, and thence progressively changing toward the feeding ends of the dies.

A screw is forged with a machine constructed as above by inserting the blank endwise at the feeding-grooves $r\,r$, when the dies are in the position shown at Fig. 1; then, as the movable die C is moved in the direction of the arrow, the ridged faces of the dies seize the blank and compel it to roll between them, the ridges at the same time indenting the blank. As the faces of the dies converge, the indentation is progressively deepened as the movable die moves onward, and, as the pitch of the ridges progressively increases toward the discharge ends of the dies, the metal compressed by the ridges is permitted to move longitudinally of the blank, and the latter becomes progressively longer as the operation proceeds.

It is preferred to have the last portion of the dies at their discharge ends of uniform pitch for a length equal to the perimeter of the screw, so that the screw, when finished, is symmetrical at all sides.

I claim as my invention—

1. The combination of two converging dies having longitudinal indenting-ridges of progressively-increasing pitch, substantially as before set forth.

2. The combination of two converging dies having longitudinal ridges of progressively-increasing pitch, and also profiles which are concave at the sides, which correspond with the point of the screw, substantially as before set forth.

Witness my hand this 30th day of October, A. D. 1873.

EDWARD CROFT.

Witnesses:
JOHN FELLOWS,
CHARLES F. COLLINS.